(12) United States Patent
Rahav et al.

(10) Patent No.: US 9,891,027 B2
(45) Date of Patent: Feb. 13, 2018

(54) SYSTEM AND METHOD FOR NEUTRALIZING SHAPED-CHARGE THREATS

(71) Applicant: Rafael Advanced Defense Systems Ltd., Haifa (IL)

(72) Inventors: Shahar Rahav, Kibbutz Dalia (IL); Elad Ben Ezra, Nahariya (IL); Nitzan Magen, Tivon (IL); Gili Hazan, Nofit (IL); Leonid Glikin, Misgav (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 0 days.

(21) Appl. No.: 15/303,608

(22) PCT Filed: Apr. 27, 2015

(86) PCT No.: PCT/IL2015/050432
§ 371 (c)(1),
(2) Date: Oct. 12, 2016

(87) PCT Pub. No.: WO2015/166483
PCT Pub. Date: Nov. 5, 2015

(65) Prior Publication Data
US 2017/0038180 A1  Feb. 9, 2017

(30) Foreign Application Priority Data
Apr. 28, 2014  (IL) .......................... 232301

(51) Int. Cl.
*F41H 11/00* (2006.01)
*F41H 11/02* (2006.01)
(Continued)

(52) U.S. Cl.
CPC ............. *F41H 11/02* (2013.01); *F41H 5/007* (2013.01); *G01S 13/66* (2013.01)

(58) Field of Classification Search
USPC ..................... 89/36.17, 1.11, 1.14
See application file for complete search history.

(56) References Cited

U.S. PATENT DOCUMENTS

| 5,661,254 A | 8/1997 | Steuer et al. |
| 6,717,543 B2 | 4/2004 | Pappert et al. |

(Continued)

FOREIGN PATENT DOCUMENTS

| EP | 1 467 171 A1 | 10/2004 |
| IL | 1 096 218 A2 | 5/2001 |

(Continued)

OTHER PUBLICATIONS

Patent Cooperation Treaty, International Search Report, International Patent Application No. PCT/IL2015/050432, dated Aug. 5, 2015, 5 Pages.

(Continued)

*Primary Examiner* — John W Eldred
(74) *Attorney, Agent, or Firm* — Fenwick & West LLP (57) ABSTRACT

The invention relates to an interceptor type system for neutralizing a shaped charge threat, which comprises: (a) a detection system for detecting an approach of a shaped charge projectile, for calculating upon such detection its course of approach, and for activating an interceptor to create a flux of intercepting fragments within a destruction corridor; and (b) one or more of said interceptors, each comprising one or more magazines of fragments, each magazine comprises said fragments and an explosive layer which in turn explodes thereby to create said flux of intercepting fragments within said destruction corridor.

11 Claims, 5 Drawing Sheets

(51) Int. Cl.
*F41H 5/007* (2006.01)
*G01S 13/66* (2006.01)

(56) References Cited

U.S. PATENT DOCUMENTS

| | | | |
|---|---|---|---|
| 6,782,793 B1* | 8/2004 | Lloyd | F41H 5/007 89/36.17 |
| 6,920,827 B2 | 7/2005 | Llyod | |
| 6,960,319 B1 | 11/2005 | Kapoor | |
| 7,077,049 B2 | 7/2006 | Shumov et al. | |
| 7,114,428 B1 | 10/2006 | Lloyd | |
| 7,202,809 B1 | 4/2007 | Schade et al. | |
| 7,236,122 B2 | 6/2007 | Pappert et al. | |
| 8,424,444 B2* | 4/2013 | Johnson | F42B 1/028 102/405 |
| 8,490,538 B2* | 7/2013 | Tawil | F41H 5/007 89/1.11 |
| 2003/0164087 A1* | 9/2003 | Vives | F41H 5/007 89/36.17 |
| 2006/0065150 A1 | 3/2006 | O'Dwyer | |
| 2006/0175464 A1 | 8/2006 | Chang | |
| 2012/0312149 A1 | 12/2012 | Marscher et al. | |
| 2014/0102288 A1 | 4/2014 | Yeshurun et al. | |

FOREIGN PATENT DOCUMENTS

| | | |
|---|---|---|
| IL | 194090 B | 9/2013 |
| WO | WO 2007/089253 A2 | 8/2007 |

OTHER PUBLICATIONS

Patent Cooperation Treaty, Written Opinion of the International Searching Authority, International Patent Application No. PCT/IL2015/050432, dated Aug. 5, 2015, 4 Pages.

Patent Cooperation Treaty, International Preliminary Report on Patentability, International Patent Application No. PCT/IL2015/050432, dated Jul. 31, 2016, 13 Pages.

* cited by examiner

Fig. 3

SYSTEM AND METHOD FOR NEUTRALIZING SHAPED-CHARGE THREATS

FIELD OF INVENTION

The invention relates in general to systems for protecting bodies, particularly armored vehicles, from incoming threats. More specifically, the invention relates to active system and method for protecting stationary or moving bodies from shaped-charge ammunition.

BACKGROUND OF THE INVENTION

Shaped charge ammunition is one of the most lethal threats to armored vehicles (or other bodies in general). Hereinafter, for the sake of brevity the following description will refer to "vehicles" or "armored vehicles". However, it should be noted that this reference to "vehicles" or "armored vehicles" does not limit the invention to any form of a body, either moving or stationary.

Shaped-charge ammunition is usually initiated by an impact activated device, which is located at the front of the threat and is activated upon contact with any solid object, especially with the target wall. This initiation causes the shaped-charge warhead to detonate and create a super high-velocity jet of molten metal, which can penetrate very thick armor, even if warhead detonation takes place at a considerable stand-off distance from the target wall. Such detonation is therefore extremely harmful and dangerous to the protected object and to its occupants. In view of the above characteristics of the shaped charge ammunition, it becomes clear that neutralization of this threat without detonating the shaped charge is of the utmost importance.

The art has provided mainly three types of measures for close-range protection of armored vehicles from shaped-charge ammunition: (a) passive net or the so-called "bar armor"; (b) a "reactive armor"; and (c) fragment-based, bullet-based, or bar-based interceptor.

Passive net or bar-armor act in deforming the nose-cone of RPG-type threats. The nose-cone is made of two co-axial, narrowly spaced aluminum shells, which conduct the electrical signal from a piezo-electric sensor at the tip to the warhead detonator. The deformation caused by the net or bar creates a short- or open-circuit that prevents the shaped-charge from detonating. This method, however, has limited effectiveness and is only useful against single charge (alias "mono") RPG-type threats.

A "reactive armor" against shaped-charge ammunition comprises plurality of explosive-backed panels that are disposed over the external surface of the armored vehicle. Upon impact between the ammunition and the reactive panel, the explosive under the panel detonates and blows the panel to corrupt the profile of the shaped-charge jet. Thus the jet, although being formed, fails to penetrate the vehicle's armor, and the explosion remains outside of the vehicle. The reactive armor is effective to some extent, still it has the following main drawbacks: (a) The reactive panels should fully cover the external surface of the vehicle's armor, therefore they add significant weight to the armored vehicle; (b) The reactive panels provide protection only at surface locations where they are disposed; and (c) Protection is activated only upon actual detonation of the ammunition and in addition also detonation of the explosive of the reactive armor. Therefore, considerable thickness of armor is still necessary to protect the vehicle and its occupants, and neighboring persons outside the vehicle may be at risk.

The third measure against shaped-charge ammunition, which is based on fragments, bullets, or any other one or more solid objects, intercepts the shaped charge projectile at some distance away from the protected object. Hereinafter, said bullets, fragments (or other types of solid objects) based measure will be referred to as "interceptor". A typical interceptor comprises a detection system, employing optical, radar or any other type of sensor or combination thereof, which detects an incoming shaped-charge projectile and calculates its course and progression. At an appropriate time the interceptor is activated to create a "beam" or "screen" of fragments or bullets, or to eject any other one or more objects or mass, that intercepts and destroys the shaped-charge ammunition. When reaction time is extremely short, one has to defeat the shaped-charge ammunition in proximity of the vehicle. In one example, IL 194090 discloses propulsion of a single disrupting element in a direction substantially perpendicular to the progression direction of an RPG, to destroy it. This method, however, only works against RPG type threats by neutralizing their piezo-electric impact switch to prevent shaped-charge jet formation. The explosive warhead remains intact and may have a secondary effect of detonation at the vehicle wall, thus endangering the vehicle and its occupants. Other examples where fragments or bullets are used are given hereinafter.

In order to fully protect the vehicle, the interceptor system is typically deployed in a peripheral manner, to intercept projectiles that may approach the vehicle from any direction. When neutralization of the shaped-charge ammunition has to take place in proximity of the vehicle, the interceptor type of protection, as disclosed in this invention, adds in general less weight to the vehicle compared to the reactive armor. Compared to reactive armor it has the additional advantage of preventing explosion of the projectile in proximity of the vehicle which may harm friendly troops in the proximity of the vehicle and eliminating the heavier base armor necessary for reactive armor protection.

Several prior art systems of the fragment-based interceptor type are disclosed in: WO 2007/089253, EP 1,467,171, U.S. Pat. No. 5,661,254, EP 1,096,218, U.S. Pat. No. 7,236, 122, U.S. Pat. No. 6,717,543, U.S. Pat. No. 6,920,827, US 2006/0175464, and US 2006/0065150. However, none of the systems of the above publications suggests destruction of a shaped-charge projectile while avoiding initiation of the projectile's charge, and explosion. As noted above, such an explosion in the proximity of the vehicle endangers the occupants of the vehicle, as well as the vehicle itself.

It is therefore an object of the present invention to provide an interceptor type system which is safer to the vehicle and its occupants, and also to neighboring persons and objects, compared to prior art interceptors.

It is a more specific object of the present invention to provide an interceptor type system which destroys a shaped charge projectile, while avoiding detonation of the projectile charge itself.

It is still another object of the present invention to provide an interceptor type system which destroys the shaped charge projectile in proximity of the vehicle, but at manner which minimizes the damage to the armored vehicle.

It is still another object of the present invention to provide a single interceptor type system which can ensure destruction of a shaped charge projectile It is still another object of the present invention to provide said interceptor system in a compact and reliable manner.

Other objects and advantages of the invention will become apparent as the description proceeds.

SUMMARY OF THE INVENTION

The invention relates to an interceptor type system for neutralizing a shaped charge threat, which comprises: (a) a detection system for detecting an approach of a shaped charge projectile, for calculating upon such detection its course of approach, and for activating an interceptor to create a flux of intercepting fragments within a destruction corridor; and (b) one or more of said interceptors, each comprising one or more magazines of fragments, each magazine comprises said fragments and an explosive layer which in turn explodes thereby to create said flux of intercepting fragments within said destruction corridor;

wherein said fragments are made of material selected from one or more of the following classes of material and respective characteristics:

| Material Characteristic | Class A | Class B | Class C |
| --- | --- | --- | --- |
| Density [Gr/Cm$^3$] | 0.8-1.5 | 2.5-3.0 | 4.0-4.5 |
| Tensile Strength [MPa] | 40-200 | 300-600 | 1000-1500 |
| Mechanical Impedance [Kg/(sec.-m$^2$)] | $0.3 \times 10^6$-$2.5 \times 10^6$ | $12.3 \times 10^6$-$15.0 \times 10^6$ | $20.0 \times 10^6$-$25.0 \times 10^6$ |

Preferably, the velocity of the fragments at the location of impact is in the range of between 800 to 2000 m/sec.

Preferably, the flux density at the location of impact with the projectile is between 4000 to 12000 fragments per m$^2$.

Preferably, the fragments are pre-packed or pre-formed within the magazine in a shape of a planar or curved shell.

Preferably, the dimensions of said planar or curved shell are up to 400×700 mm, and thickness between 4 mm and 15 mm.

Preferably, the system of the invention is used for protecting a moving or a stationary object from shaped charge threats.

Preferably, plurality of interceptors are provided in the periphery of said moving or a stationary object.

Preferably, each interceptor comprises two magazines that are mounted in a back-to-back manner, therefore to produce said flux of intercepting fragments within two destruction corridors, respectively.

Preferably, the magazine comprises a mixture fragments, made from two or more of said classes of materials.

Preferably, each fragment is made from two or more of said classes of materials.

DETAILED DESCRIPTION OF PREFERRED EMBODIMENTS

The present invention provides an interception type system for neutralizing a shaped charge projectile, with no initiation of the projectile's detonator, therefore without detonation of the charge.

Figure 1A:
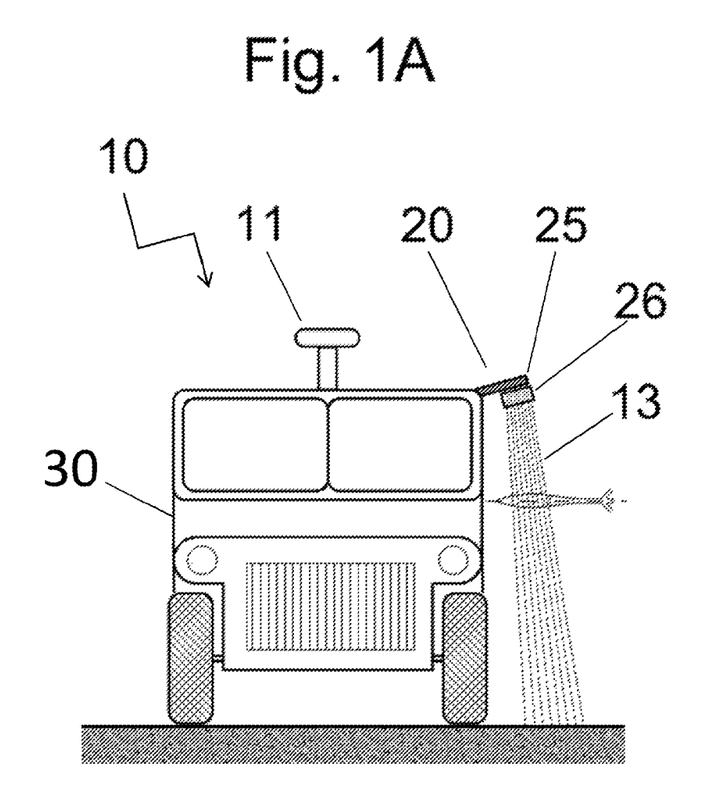
FIGS. 1A and 1B illustrate, in front- and side-views, respectively, a vehicle which is provided with an interceptor type protection system according to an embodiment of the present invention.
Figure 1B:
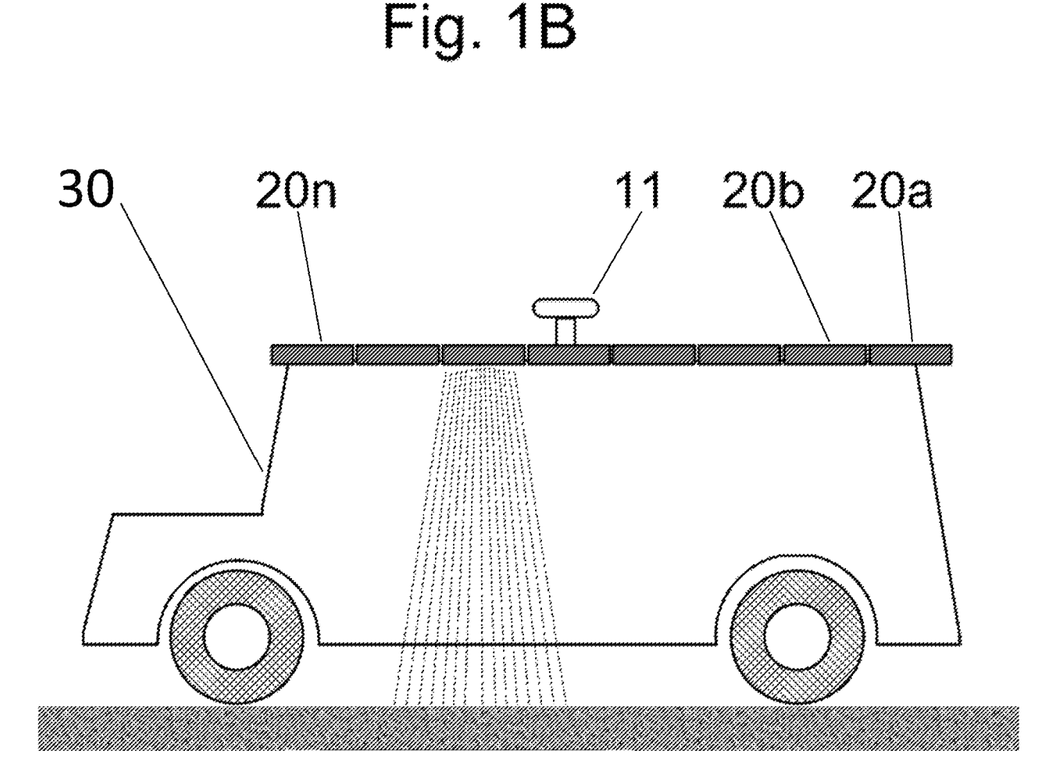

FIGS. 1A and 1B illustrate, in front- and side-views, respectively, a vehicle 30 which is provided with an interceptor type protection system 10 according to an embodiment of the present invention. A sensing and activation unit 11 senses an approach of a projectile towards the vehicle 30, and at an appropriate time, when the projectile arrives at a "destruction corridor" (i.e., a destruction space which is covered by one or more interceptors), the sensing and activation unit activates respectively one or more of interceptors 20 (for the sake of brevity, only one interceptor is shown in FIG. 1A). Variety of sensing and activation units 11 are known in the art, for example, such unit is discussed in US 2011/0162518. Therefore, and for the sake of brevity, the sensing and activation unit 11 will not be discussed further herein, as it is not a part of the invention.

The protection system 10 further comprises one or more (preferably plurality) interceptors 20. In order to provide a 360° protection, interceptors 20a-20n are preferably disposed in a full peripheral manner at the top of the vehicle as shown in FIG. 1B, which presents the left-hand side of the vehicle. Each of the interceptors 20a-20n substantially comprises a support 25 and a fragments magazine 26.

Figure 2:
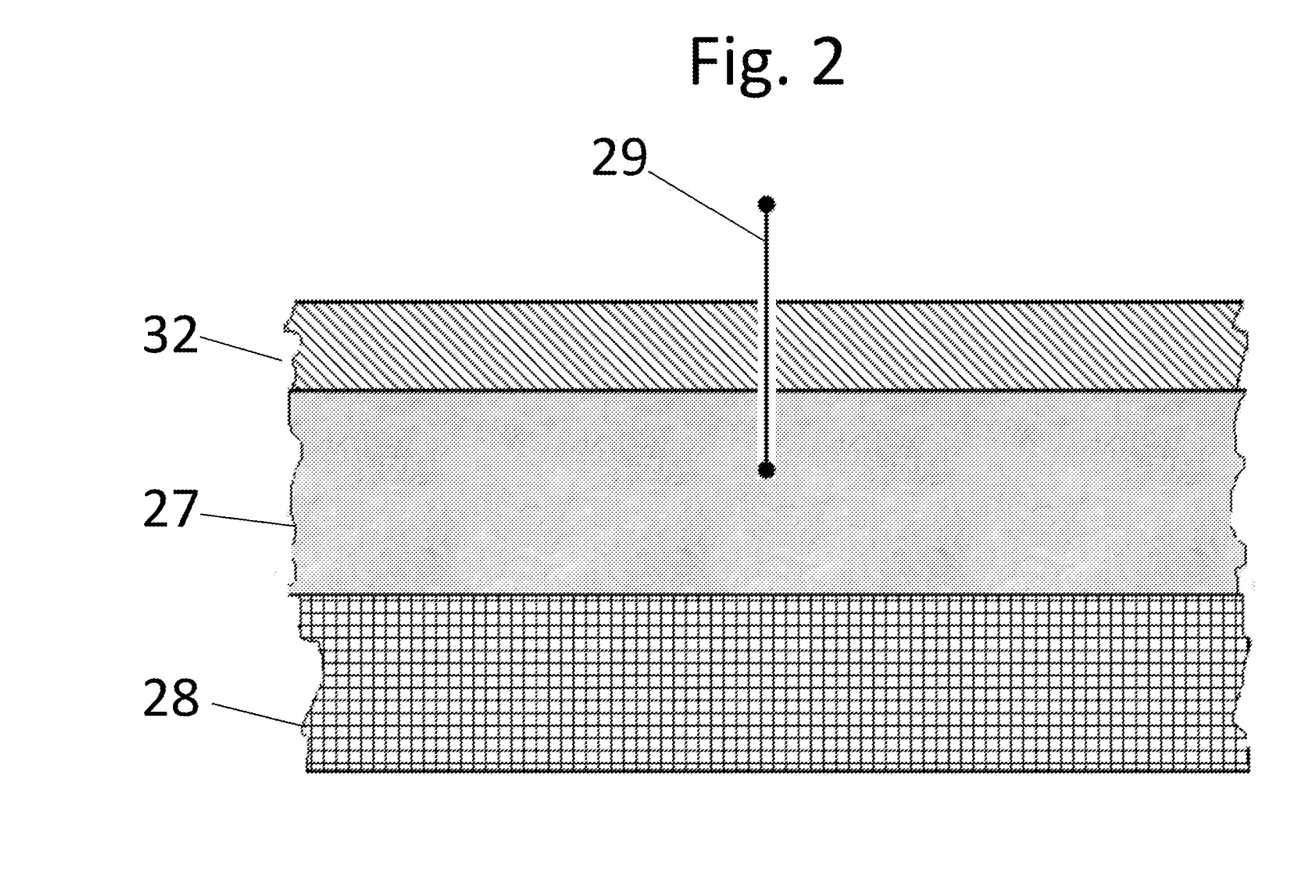
FIG. 2 describes in a general form a structure of a fragments magazine according to an embodiment of the present invention.

FIG. 2 describes in a general form the structure of a fragments magazine 26. The fragments magazine 26 comprises substantially three layers, an anvil layer 32, an explosive layer 27, and a fragments layer 28. Upon detection of a projectile, a signal 29 is provided to the explosive layer from the sensing and activation unit 11, which in turn explodes and accelerates the fragments 28, thereby to produce said destruction corridor 13. Preferably, the fragments within the fragment layer are pre-packed (i.e., separate bodies that are bonded together), or pre-formed (i.e., a single large body is provided as layer 28, on which slots are made to mark locations for future separation of the body to plurality of fragments). Each of the fragments may have any shape, such as spherical, cylindrical, rectangular, prismatic etc. Anvil 32 which is made of an armor metal assures a uni-directional acceleration of the fragments, i.e., only in a direction towards the destruction corridor 13, as shown in FIG. 1A.

The inventors have found several characteristics that are essential to guarantee destruction of a shaped charge projectile, without initiation of its explosive, as follows: (a) characteristics relating to the material from which the fragments are made; (b) characteristics relating to the fragment flux density within the "destruction corridor"; (c) characteristics relating to the flow of the fragments toward the shaped charge projectile.

The inventors have found three classes of materials that are suitable for a projectile destruction without initiation of the explosive. The characteristics of these classes are as follows:

| Material Characteristic | Class A | Class B | Class C |
| --- | --- | --- | --- |
| Density [Gr/Cm$^3$] | 0.8-1.5 | 2.5-3.0 | 4.0-4.5 |
| Tensile Strength [MPa] | 40-200 | 300-600 | 1000-1500 |

-continued

| Material Characteristic | Class A | Class B | Class C |
|---|---|---|---|
| Mechanical Impedance [Kg/(sec.-m$^2$)] | $0.3 \times 10^6$- $2.5 \times 10^6$ | $12.3 \times 10^6$- $15.0 \times 10^6$ | $20.0 \times 10^6$- $25.0 \times 10^6$ |

Note:
The "mechanical impedance" is defined as the product of the material density $\rho$ and the speed of sound in the material c.

It should be noted that the art has never suggested use of these classes of materials and respective characteristics for this shaped charge neutralizing purpose, and as noted before, the advantages resulting from the use of these classes of materials are very substantial.

It should be noted that the Classes of materials as defined herein are not mutually exclusive, i.e. certain fraction of the fragments may be made of Class A material while the remainder of the fragments may be made of Class B material, or any other combination of material Classes and fragment fractions. It is also possible that the fragments may be composed of more than one material Class. For example, it is possible that the fragments be made of a fragment core made of material Class B embedded within a larger volume of material Class A, or any other combination of fragment shapes and material Classes.

A second characteristic which is essential for assuring destruction of the projectile without initiation of the charge is the flux density of the fragments at the location of impact with the projectile. Preferably, when the fragments are provided within layer 28 they are either pre-packed or pre-formed in a shape of a planar or curved shell having dimensions of up to 400×700 mm, and having a thickness between 4 mm and 15 mm. It has been found that the fragments created from such a layer should have a flux density between 4000 to 12000 fragments per m$^2$ at the location of impact with the projectile.

A third characteristic which is essential for assuring destruction of the projectile without initiation of the charge is the velocity of the fragments at the location of impact with the projectile. It has been found that this velocity has to be in the range between 800 to 2000 m/sec.

Figure 1C:
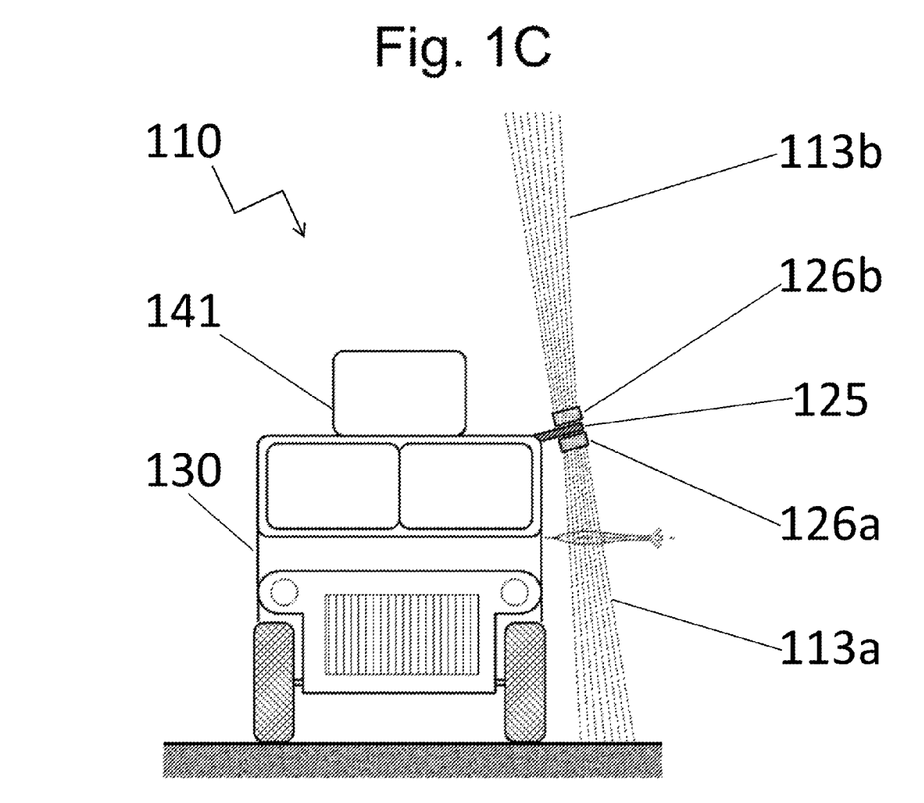
FIG. 1C illustrates, in front view, a vehicle which is provided with an interceptor type protection system, said interceptor comprises two magazines that are arranged in a back-to-back manner.

In still another embodiment shown in FIG. 1C, the system 110 may comprise one or more of back-to-back mounted fragments magazines 126a and 126b. The two back-to-back mounted fragments magazines can provide two destruction corridors respectively, a first one directing downward (as in FIG. 1A), and a second one directing upward. Such a structure may be particularly useful to protect vehicles having a turret, such as turret 141. The two back-to-back mounted magazines 126a and 126b may be activated simultaneously. In another option, only one magazine, as controlled by the sensing and activation unit (not shown in FIG. 1C) may be activated. A simultaneous activation of two back-to-back mounted magazines has an advantage of resulting with less recoil, as the two oppositely directed recoils cancel each other respectively.

As noted above, the invention provides an interceptor-type system which can assure to a high extent a destruction of shaped charge projectile, without initiation of the projectile's explosive. In such a manner, and particularly due to the fact that the explosive within the projectile is neutralized without explosion, the system of the invention provides a better protection to the vehicle, to the vehicle's occupants, and to the environment.

EXAMPLE

Figure 3:
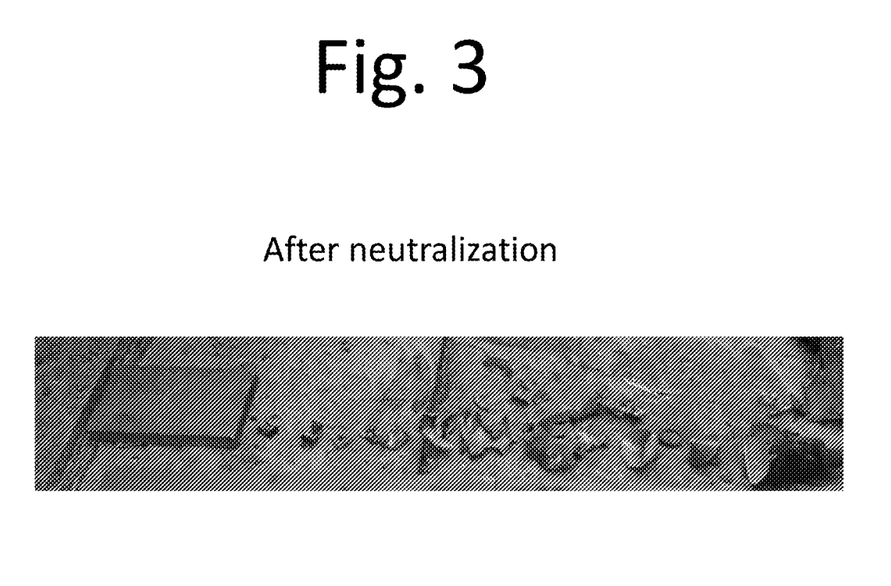
FIG. 3 is a photograph showing remnants of shaped charge projectile as destroyed by an interceptor according to an embodiment of the present invention.

A shaped charge projectile was launched towards an interceptor according to an embodiment of the present invention. The interceptor has destroyed the projectile without initiation of the projectile's explosive. FIG. 3 provides a photograph showing the remnants of said destroyed projectile.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An interceptor type system for neutralizing a shaped charge projectile while avoiding initiation of the projectile's detonator, thereby also avoiding detonation of its warhead charge, which comprises:
    (a) a detection system for detecting an approach of a projectile, for calculating upon such detection its course and progression, and for activating an interceptor to create a flux of intercepting fragments within a destruction corridor; and
    (b) one or more of said interceptors, each interceptor comprising one or more magazines of fragments, each magazine comprising said fragments and an explosive layer, said explosive layer explodes upon said activation thereby to create said flux of intercepting fragments within said destruction corridor;
    wherein each of said fragments are made of material selected from one or more of the following classes of material and respective characteristics:

| Material Characteristic | Class A | Class B | Class C |
|---|---|---|---|
| Density [Gr/Cm$^3$] | 0.8-1.5 | 2.5-3.0 | 4.0-4.5 |
| Tensile Strength [MPa] | 40-200 | 300-600 | 1000-1500 |
| Mechanical Impedance [Kg/(sec.-m$^2$)] | $0.3 \times 10^6$- $2.5 \times 10^6$ | $12.3 \times 10^6$- $15.0 \times 10^6$ | $20.0 \times 10^6$- $25.0 \times 10^6$ | and wherein if the approached projectile is happened to be a shaped-charge type projectile, the projectile is destroyed by said flux of intercepting fragments without initiation of the projectile's detonator.

2. System according to claim 1, wherein the velocity of the fragments at the location of impact is in the range of between 800 to 2000 m/sec.

3. System according to claim 1, wherein the flux density at the location of impact with the projectile is between 4000 to 12000 fragments per m$^2$.

4. System according to claim 1, wherein the fragments are pre-packed within the magazine in a shape of a planar or curved shell.

5. System according to claim 4, wherein the dimensions of said planar or curved shell are up to 400×700 mm, and thickness between 4 mm and 15 mm.

6. System according to claim 1, used for protecting a moving or a stationary object from shaped charge threats.

7. System according to claim 6, wherein plurality of interceptors are provided in the periphery of said moving or a stationary object.

8. System according to claim 1, wherein each interceptor comprises two magazines that are mounted in a back-to-back manner, therefore to produce said flux of intercepting fragments within two destruction corridors, respectively.

9. System according to claim 1, wherein the magazine comprises a mixture of fragments, made from two or more of said classes of materials.

10. System according to claim 1, wherein each fragment is made from two or more of said classes of materials.

11. System according to claim 1, wherein the fragments are pre-formed within the magazine in a shape of a planar or curved shell.

\* \* \* \* \*